(12) United States Patent
Koster

(10) Patent No.: US 9,781,266 B1
(45) Date of Patent: *Oct. 3, 2017

(54) FUNCTIONS AND ASSOCIATED COMMUNICATION CAPABILITIES FOR A SPEECH ANALYTICS COMPONENT TO SUPPORT AGENT COMPLIANCE IN A CONTACT CENTER

(71) Applicant: Noble Systems Corporation, Atlanta, GA (US)

(72) Inventor: Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,663

(22) Filed: Feb. 7, 2017

Related U.S. Application Data

(63) Continuation of application No. 13/968,692, filed on Aug. 16, 2013, now Pat. No. 9,602,665, which is a continuation-in-part of application No. 13/949,467, filed on Jul. 24, 2013, now Pat. No. 9,225,833.

(51) Int. Cl.
| | | |
|---|---|---|
| *H04M 3/00* | (2006.01) | |
| *H04M 3/51* | (2006.01) | |
| *G10L 15/22* | (2006.01) | |
| *G10L 15/08* | (2006.01) | |
| *G10L 15/26* | (2006.01) | |

(52) U.S. Cl.
CPC ........... *H04M 3/5175* (2013.01); *G10L 15/22* (2013.01); *G10L 15/265* (2013.01); *G10L 2015/088* (2013.01); *G10L 2015/223* (2013.01); *H04M 2203/401* (2013.01)

(58) Field of Classification Search
CPC .. H04M 3/5175; H04M 3/523; H04M 3/5158; H04M 3/5183; H04M 3/5232; H04M 3/493; H04M 3/4936; H04M 3/5166; H04M 3/42221; H04M 2201/40
USPC ............... 379/265.01–265.02, 266.07, 88.01
See application file for complete search history.

(56) References Cited

U.S. PATENT DOCUMENTS

| | | |
|---|---|---|
| 5,267,305 A | 11/1993 | Prohs et al. |
| 5,270,920 A | 12/1993 | Pearse et al. |
| 6,157,808 A | 12/2000 | Hollingsworth et al. |
| 6,356,634 B1 | 3/2002 | Noble, Jr. |

(Continued)

OTHER PUBLICATIONS

U.S. Appl. No. 61/753,641, filed Dec. 31, 1899, Watson et al.

(Continued)

*Primary Examiner* — Rasha Al Aubaidi

(57) ABSTRACT

A command set and associated capabilities are defined for a speech analytics component ("SAC") in a call center. The speech analytics component is used to monitor speech of an agent and a remote party on a call for the purpose of determining whether the agent is complying with various call center policies or applicable regulations. The command set allows the call handler to instruct the SAC to load a keyword set into memory for future use, apply the keyword set to an indicated call and for an indicated party, to remove use of the keyword set, and to release the keyword set from memory. This allows the SAC to monitor speech as required for a particular context, which is known to the call handler, but not necessarily by the SAC. In this way, efficient use of the SAC processing resource is obtained for various call contexts.

20 Claims, 9 Drawing Sheets

(56) References Cited

U.S. PATENT DOCUMENTS

| | | |
|---|---|---|
| 6,721,416 B1 | 4/2004 | Farrell |
| 6,862,343 B1 | 3/2005 | Vacek et al. |
| 7,133,828 B2 | 11/2006 | Scarano et al. |
| 7,542,902 B2 | 6/2009 | Scahill et al. |
| 7,548,539 B2 | 6/2009 | Kouretas et al. |
| 7,574,000 B2 | 8/2009 | Blair |
| 7,672,845 B2 | 3/2010 | Beranek et al. |
| 7,752,043 B2 | 7/2010 | Watson |
| 7,930,179 B1 | 4/2011 | Gorin et al. |
| 7,974,411 B2 | 7/2011 | Krishnapuram et al. |
| 8,078,470 B2 | 12/2011 | Levanon |
| 8,094,790 B2 | 1/2012 | Conway et al. |
| 8,094,803 B2 | 1/2012 | Danson et al. |
| 8,155,297 B1 | 4/2012 | Dhir et al. |
| 8,175,007 B2 | 5/2012 | Jain et al. |
| 8,180,643 B1 | 5/2012 | Pettay et al. |
| 8,204,180 B1 | 6/2012 | Narayanan et al. |
| 8,209,182 B2 | 6/2012 | Narayanan |
| 8,219,401 B1 | 7/2012 | Pettay et al. |
| 8,249,875 B2 | 8/2012 | Levanon et al. |
| 8,275,115 B1 | 9/2012 | Everingham et al. |
| 8,396,205 B1 | 3/2013 | Lowry et al. |
| 8,396,732 B1 | 3/2013 | Nies et al. |
| 8,401,155 B1 | 3/2013 | Barnes et al. |
| 8,422,641 B2 | 4/2013 | Martin, II |
| 8,463,606 B2 | 6/2013 | Scott et al. |
| 8,504,371 B1 | 8/2013 | Vacek et al. |
| 8,531,501 B2 | 9/2013 | Portman et al. |
| 8,649,499 B1 | 2/2014 | Koster et al. |
| 8,761,376 B2 | 6/2014 | Pande et al. |
| 8,767,948 B1 | 7/2014 | Riahi et al. |
| 8,781,092 B2 | 7/2014 | Noble, Jr. |
| 8,949,128 B2 | 2/2015 | Meyer et al. |
| 9,014,364 B1 | 4/2015 | Koster et al. |
| 2003/0002651 A1 | 1/2003 | Shires |
| 2003/0154120 A1 | 8/2003 | Freishtat et al. |
| 2004/0008828 A1 | 1/2004 | Coles et al. |
| 2004/0249650 A1 | 12/2004 | Freedman et al. |
| 2005/0238161 A1 | 10/2005 | Yacoub et al. |
| 2005/0283475 A1 | 12/2005 | Beranek et al. |
| 2005/0286705 A1 | 12/2005 | Contolini et al. |
| 2005/0286706 A1 | 12/2005 | Fuller |
| 2006/0050658 A1 | 3/2006 | Shaffer et al. |
| 2006/0111953 A1 | 5/2006 | Setya |
| 2006/0233346 A1 | 10/2006 | McIlwaine et al. |
| 2006/0256954 A1 | 11/2006 | Patel et al. |
| 2006/0259473 A1 | 11/2006 | Li et al. |
| 2006/0262919 A1 | 11/2006 | Danson et al. |
| 2006/0265090 A1 | 11/2006 | Conway et al. |
| 2007/0088563 A1 | 4/2007 | Nardotti, Jr. et al. |
| 2007/0111180 A1 | 5/2007 | Sperle et al. |
| 2007/0160054 A1 | 7/2007 | Shaffer et al. |
| 2007/0198330 A1 | 8/2007 | Korenblit et al. |
| 2007/0280211 A1 | 12/2007 | Malueg et al. |
| 2007/0280460 A1 | 12/2007 | Harris et al. |
| 2008/0002823 A1 | 1/2008 | Fama et al. |
| 2008/0027785 A1 | 1/2008 | Mechaley et al. |
| 2008/0037719 A1 | 2/2008 | Doren |
| 2008/0082330 A1 | 4/2008 | Blair |
| 2008/0240376 A1 | 10/2008 | Conway et al. |
| 2008/0270123 A1 | 10/2008 | Levanon et al. |
| 2009/0157449 A1 | 6/2009 | Itani et al. |
| 2009/0295536 A1 | 12/2009 | Doren |
| 2010/0036670 A1 | 2/2010 | Hill et al. |
| 2010/0082342 A1 | 4/2010 | Erhart et al. |
| 2010/0104086 A1 | 4/2010 | Park |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0033036 A1 | 2/2011 | Edwards et al. |
| 2011/0125499 A1 | 5/2011 | Griggs et al. |
| 2011/0145093 A1 | 6/2011 | Paradise et al. |
| 2011/0202344 A1 | 8/2011 | Meyer et al. |
| 2011/0218798 A1 | 9/2011 | Gavalda |
| 2011/0228919 A1 | 9/2011 | Tew et al. |
| 2011/0307258 A1 | 12/2011 | Liberman et al. |
| 2011/0317828 A1 | 12/2011 | Corfield |
| 2012/0045043 A1 | 2/2012 | Timpson |
| 2012/0140911 A1 | 6/2012 | Johansen et al. |
| 2012/0263285 A1 | 10/2012 | Rajakumar et al. |
| 2013/0003943 A1 | 1/2013 | Munns et al. |
| 2013/0129069 A1 | 5/2013 | Peterson |
| 2013/0246053 A1 | 9/2013 | Scott et al. |
| 2014/0100848 A1 | 4/2014 | Shaffer et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0241519 A1 | 8/2014 | Watson et al. |
| 2014/0257820 A1 | 9/2014 | Laperdon et al. |
| 2014/0379525 A1 | 12/2014 | Timem et al. |
| 2015/0106091 A1 | 4/2015 | Wetjen et al. |
| 2015/0281445 A1 | 10/2015 | Kumar et al. |
| 2015/0281446 A1 | 10/2015 | Milstein et al. |

OTHER PUBLICATIONS

Office Action Received for U.S. Appl. No. 15/231,154 dated Feb. 10, 2017.

Office Action Received for U.S. Appl. No. 14/080,912 dated Feb. 10, 2017.

Office Action Received for U.S. Appl. No. 15/051,930 dated Mar. 3, 2017.

US 9,781,266 B1

FUNCTIONS AND ASSOCIATED COMMUNICATION CAPABILITIES FOR A SPEECH ANALYTICS COMPONENT TO SUPPORT AGENT COMPLIANCE IN A CONTACT CENTER

RELATED APPLICATIONS

This application is a continuation of U.S. patent application Ser. No. 13/968,692, now U.S. Pat. No. 9,602,665, which in turn is a continuation-in-part of U.S. non-provisional patent application Ser. No. 13/949,467, now U.S. Pat. No. 9,225,833, entitled "Management System for Using Speech Analytics To Enhance Contact Center Agent Conformance," filed on Jul. 24, 2013, the contents of which are incorporated by reference for all it teaches.

FIELD OF THE DISCLOSURE

The concepts and technologies disclosed herein generally pertain to operation of a speech analytics component used in a contact center for the management of agent compliance with contact center policies.

BACKGROUND OF THE INVENTION

Speech analytics can be used to monitor speech of parties on a telephone call in a call center. This can be a useful tool for managing agent conformance with call center policies and regulations for various contexts, as described in the above identified patent application, Management System for Using Speech Analytics To Enhance Contact Center Agent Conformance," the contents of which are incorporated by reference. Doing so requires a speech analytics component to monitor speech of the parties and report detection of various words and/or phrases in a keyword set. However, doing so by the speech analytics component can be processing intensive, and scaling a solution to manage an increasing number of potential compliance contexts during a call, as well for an increasing number of calls, can require increasing processing resources. This, in turn, may cause increased capital costs to be expended to operate the additional computer servers and resources, rendering the application of speech analytics for managing agent conformance to be cost-prohibitive. Therefore, systems and methods are required to reduce the processing requirements in the speech analytics component when used in a call center to manage agent compliance by using speech recognition.

SUMMARY

Various embodiments are disclosed for managing application of keyword sets in a speech analytics component that may be used in one embodiment for managing compliance enforcement in a contact center. In various embodiments, commands may be sent to a speech analytics component ("SAC") to indicate how certain keyword sets are to be used. This includes a command for applying a specified keyword set on the speech of an indicated party on an indicated call. The SAC may recognize these various commands in order to more efficiently process speech from parties on a call. In one embodiment, the call handler may variously direct the SAC as to which keyword sets should be used at what times for a call.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1A:
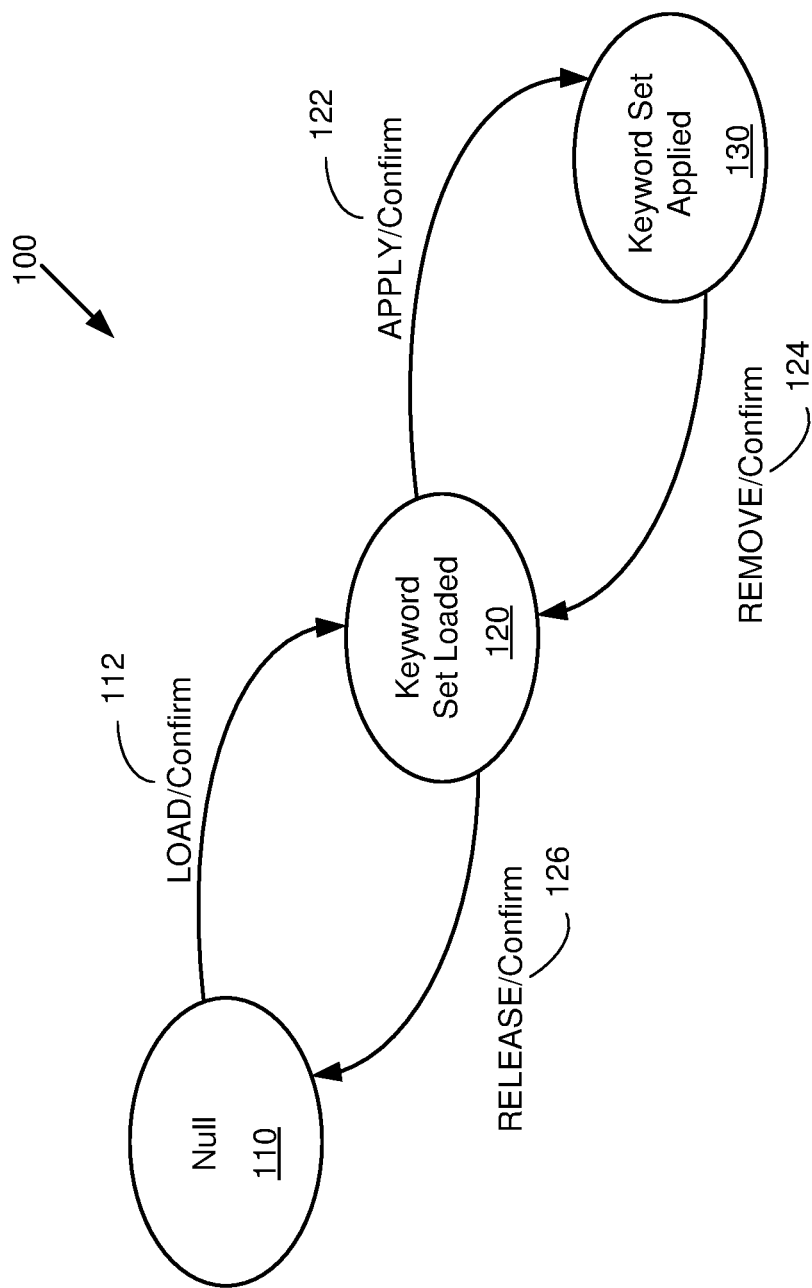
FIGS. 1A, 1B, and 2 illustrate various embodiments of state transition diagrams associated with various commands received at a speech analytics component from a call hander.

The present invention is generally directed to functional capabilities associated with a speech analytics component ("SAC") in a call center. The SAC is used to analyze speech in a call between an agent and a remote party, as is described in U.S. non-provisional patent application Ser. No. 13/949, 467, entitled "Management System for Using Speech Analytics To Enhance Contact Center Agent Conformance," filed on Jul. 24, 2013, the contents of which are incorporated by reference for all it teaches. The SAC can report instances of detection of certain phrases or words (called keywords) in speech of the agent, or the remote party.

The SAC can be used to manage agent compliance with various regulations and policies instituted by the call center. For example, the SAC can be used to monitor the agent's speech to ensure that the agent does not ever utter curse words. It becomes evident that in various situations the remote party may utter a curse word to the agent, but such occurrences do not warrant the agent responding in a similar manner. Thus, for the SAC to be useful to managing agent compliance, it has to be able to distinguish which party (i.e., the remote party or the agent) uttered the profanity. Merely knowing that one of the parties uttered a profanity does not aid in managing agent conformance, since the agent may not be guilty of violating the policy.

The above example illustrates the need to know the context in which certain words are detected. The "context" involves all the information necessary to make a useful determination of whether a particular agent has complied with a policy or regulation. In the above example, merely determining a profanity was uttered does not provide sufficient contextual information to know whether the policy was followed. However, knowing which party uttered the profanity is necessary and allows a determination of whether the agent conformed to a "no-profanity" policy or not.

In many instances, the information necessary to determine the context may involve other aspects. For example, a particular call may have to be identified or the campaign for which the call is associated with may have to be known. Obviously, a policy requiring an agent to thank a called party for a donation does not make sense if the call campaign is for a customer satisfaction survey.

Similarly, if the call center handles multiple calls and a corresponding set of agents, knowing which agent uttered the profanity is also necessary. Merely knowing that one of several agents uttered the profanity may or may not be sufficient for the purposes of the call center administrator. For example, the call center may have a no-profanity policy, and may determine if any agent violates the policy, the administrator may address violations by reminding the entire workforce that profanity is not allowed. Other call centers may have a policy of identifying which agent violated the policy and individually counsel that agent as to the policy.

The context for determining whether a policy is adhered to may involve situations where the agent has to respond in a certain manner to information provided by the agent. For example, certain regulations may require an agent to cease attempts in collecting a debt once the remote party has informed the agent that they have filed for bankruptcy. The call center may have as a policy that the agent should then inquire as to that person's lawyer or law firm handling the bankruptcy. As described in the aforementioned patent application entitled, "Management System for Using Speech Analytics To Enhance Contact Center Agent Conformance," the agent's response may be monitored for certain keywords, such as "lawyer" or "attorney" to ascertain if the agent inquired about the remote party's lawyer. In this context, merely being informed by the SAC that a party spoke the word "attorney" or "lawyer" is not useful. Furthermore, even if the notification merely indicates that the agent spoke one of these words, such notification is not instructive. For example, the agent could be informed by the remote party that they are a lawyer, and the agent could confirm such. In this case, knowing the required context in which the agent spoke a keyword involves knowing that the call is:

a) a debt collection call, b) the called party informed the agent of their bankruptcy filing, and then in response, c) the agent inquired about the called party's lawyer handling the bankruptcy filing.

Thus, it is only in the context of a debt collection call and after the called party has informed the agent of their bankruptcy that the agent is expected to use the words "lawyer" or "attorney" to ascertain the party's attorney.

The above illustrates that the context of a particular compliance situation may be fact-specific. The conditions in which compliance with a policy or regulation is adhered to (or not) can vary by a number of factors. Returning to the above mentioned debt collection example, once the called party informs the agent of bankruptcy and the agent is determined to have inquired about the called party's lawyer or attorney, there may not be any further need to monitor the call for this particular context again. That is, once the agent has been determined as complying with the policy, there is no need to continue to monitor the called party for an indication of bankruptcy filing. Further, once the agent has inquired of the called party's lawyer, there is no need to monitor the agent. Thus, if the called party re-iterates later in the call that they regret having to have filed for bankruptcy, the SAC does not need to start monitoring the agent's speech again to determine if the agent has inquired about the called party's lawyer or attorney. In this case, there is no need for the SAC to continuously monitor for keywords after a certain point.

As it can be appreciated from the above example, in various contexts the SAC may be expected to monitor a designated party's speech for certain keywords, and based on detecting a first keyword from a first party, the SAC may be required to then monitor the other party for other keywords. Based on the context, it may be necessary to return to monitoring the original party's speech, or not. Those experienced in call center operation will recognize that the possible situations for ascertaining compliance to regulations or policies will vary immensely. Generally, it is desirable to avoid the SAC from having to know all these different contextual requirements, which can change, and which may be difficult to program into the SAC.

One approach for avoiding the SAC from knowing the contextual requirements is to have the SAC monitor speech for all the possible keywords at all times and report all instances when detected. As evident from the above examples, this can provide numerous indications of keywords being detected that are not useful. (Recall that once the agent has inquired about the called party's attorney, that subsequent instances of the agent's use of such keywords are no longer required.) Furthermore, significant processing resources can be expended in the SAC attempting to analyze all the speech for various keywords. Further, reporting each instance may not be useful, and so the call handler receiving such indications must know when to ignore them. This means that the processing resources in the call handler can also be minimized by avoiding unnecessary processing in the SAC.

Processing speech can be very intensive, and as the scale of the call center increases, so does the required processing power. Monitoring speech in real time of ten agents may require a given level of processing power, and monitoring speech for fifty agents may require proportionately more. As the call center increases to several hundred agents, or in some cases over a thousand agents, the processing requirements may be significant. Further, analyzing speech for keywords when such detection is not required further wastes resources. For example, a call center may not need to monitor the remote party's speech for profanity, but if it does so, then processing resources are being wasted, and at some point, additional processing resources and management thereof may be required to detect the keywords that are required to be monitored.

The concepts and technologies herein allow the SAC to be informed as to which keyword sets should be applied and when. This avoids the SAC from having to know the context for each call, and allows processing resources to be effectively used. This is accomplished by a small set of commands issued to the SAC by the call handling device. The command set directed to the SAC may involve: LOAD, APPLY, REMOVE, and RELEASE. The names used are not particularly significant, as other names may be applied for commands and the corresponding functions to be performed.

In other embodiments, not all of these commands are required, or additional commands may be defined.

In brief, the LOAD command instructs the SAC to retrieve a keyword set from a data store and load it into working memory. The APPLY command instructs the SAC to use a specified keyword set in analyzing speech of an indicated party for a particular call. The REMOVE command instructs the SAC to cease applying a keyword set for analyzing speech, and the RELEASE command indicates to the SAC that the keyword set is not required for the immediate future, and so the memory can be used for other purposes.

State Transition Diagrams

Turning to FIG. 1A, a state transition diagram is illustrated that can be useful to explain the commands and corresponding functions in the SAC. The states represent combinations of various values of variables and conditions in the SAC at certain points in time and in response to receiving certain commands. The state may be entered upon powering up the system, or after receiving a particular command from the call handler over an application programming interface ("API"). The commands are sent from the call handler, which may be a dialer or automatic call distributor in various embodiments. The call handler is presumed to be aware of the context for the particular compliance policy or regulation that is relevant and issues the commands to the SAC accordingly. Generally, it is preferable to avoid requiring the SAC to know the details of the context that a particular call center regulation applies to.

The commands sent to the SAC will typically result in a response message from the SAC. A positive acknowledgement of a command is referred to herein as a Confirm message, whereas a negative acknowledgement of the command is referred to herein as a Reject message. Other labels could be used in other embodiments. The Reject message reflects an exceptional or abnormal condition, which will be explained further. In various embodiments, these may include information as to why the particular response was sent (such as a cause code if the command was not carried out). In most instances, operation herein is illustrated by normal operation, so that a Confirm message is illustrated in the diagrams. The format of the Confirm message for various situations is similar, and hence may not be elaborated upon. Exceptions, of which there are many possible that are not detailed herein, would result in sending a Reject message.

Turning to FIG. 1A, the state transition diagram 100 begins with the Null state 110. This state represents the state that exists in the SAC when first starting. This could be, for example, the state prior to the SAC receiving a call leg from the call handler. The first command to be received by the SAC is a LOAD command 112. The figure illustrates this command as "LOAD/Confirm" 112 to reflect the command ("LOAD") and the expected response under normal conditions ("Confirm"). Thus, the format is "Command/Response" with a forward slash separating the two. Thus, at the very beginning of system startup, the SAC receives a LOAD command 112 from the call handler and in response, the SAC will load the identified keyword set into its working memory and respond with a Confirm message 112. As a result, the SAC is in the Keyword Set Loaded state 120.

In the Keyword Set Loaded state 120, the SAC has loaded the keyword set into its working memory, and is ready to use the keyword set for analyzing speech, once it is commanded to do so. There may be various so-called housekeeping details associated with loading the keyword set, such as initializing parameters and pointers, establishing initial matrix values, etc. These functions may take some time, and so it may be preferable for the SAC to load the keyword set prior to requiring its use, even though the time for these housekeeping functions may take only a fraction of a second. The keyword set may be retrieved from a local data store or a remote data store. Various local networks can be used to retrieve the keyword set from a data store.

At this point, the SAC is ready to receive a command to use the loaded keyword set. The SAC may then receive an APPLY command 122. If so, that will move the SAC from the Keyword Set loaded state 120 into the Keyword Set Applied state 130. In this state, the SAC is applying the indicated keyword set for analyzing the speech of one of the parties on a designated call. In other words, the speech for the appropriate party is now being analyzed for occurrences of one of the keywords in the indicated keyword set. The SAC will continue to monitor the speech while in this state. It is in this state that the SAC may return various EVENT NOTIFICATION messages to the call handler. The transmittal of EVENT NOTIFICATION messages is not shown in FIG. 1A, as FIG. 1A only depicts the various commands received from the call handler and the responses sent, and not the notifications of detected keywords in the keyword set.

In one embodiment, the SAC will return to the Keyword Set Loaded state 120 upon receiving a REMOVE command 124 while in the Keyword Set Applied state 130. Receipt of the REMOVE command 124 effectively terminates applying the keyword set to specific speech, as was indicated previously via the APPLY command. The REMOVE command provides the benefit of releasing processing resources from use, as those resources are no longer processing the speech for detection of a keyword. Once returned to the Keyword Set Loaded state 120, the keyword set may once again be loaded upon receipt of the APPLY command.

Alternatively, once in this Keyword Set Loaded state 120, the SAC may receive a RELEASE message 126, which if confirmed, results in the keyword set being potentially erased from working memory, or at least allowing the memory occupied it to be released for other uses. The SAC then transitions back to the Null state 110.

Figure 1B:
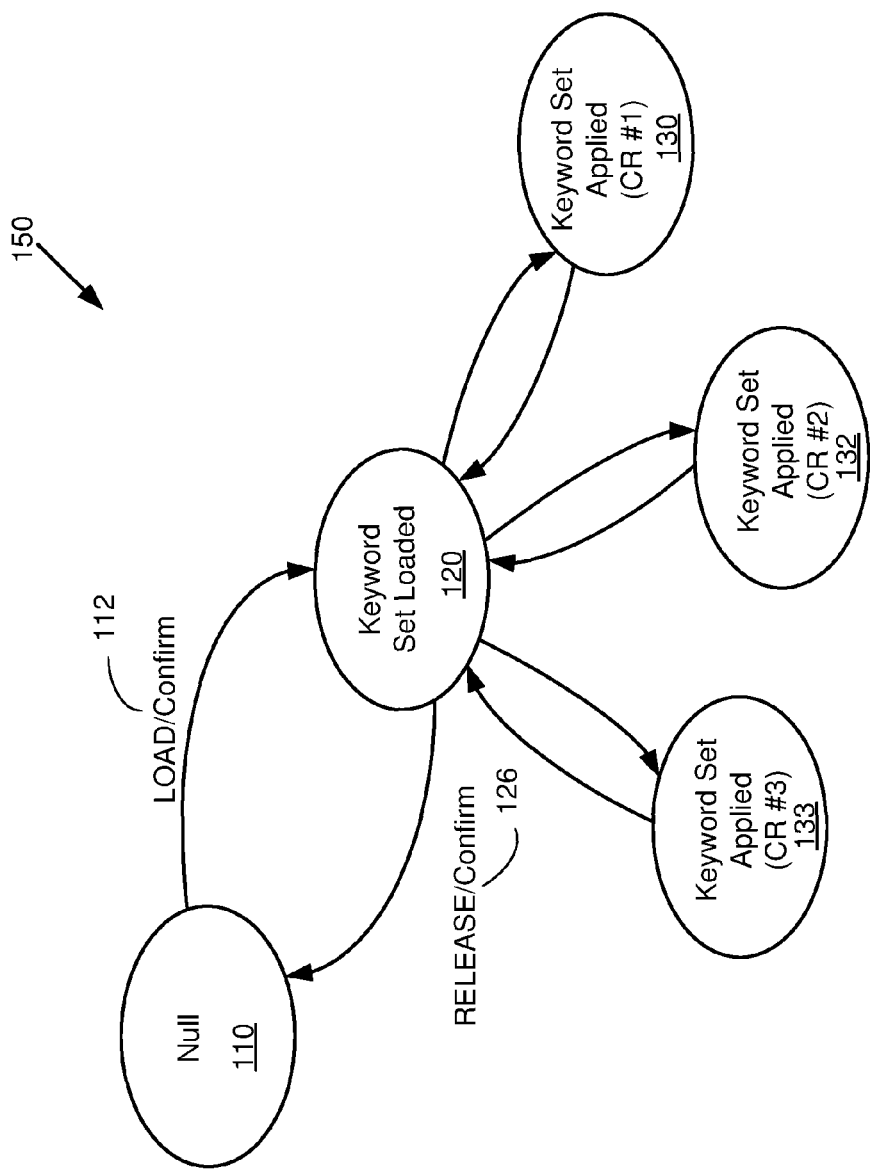

The Null and Keyword Set Loaded states are global states. That is, these states apply to any subsequent calls that are established between the call handler and the SAC. The Keyword Set Applied state is call-specific. Consequently, there could be a plurality of Keyword Set Applied states 130 for a given Keyword Set Loaded State. More specifically, once a keyword set is loaded, it could be applied to a first call leg and a second call leg, etc. This is illustrated in the state diagram 150 of FIG. 1B, which shows several Keyword Set Applied states 130, 132, and 133. Each of these could be entered upon the SAC receiving an APPLY command applying the same keyword set but for a different call, as indicated by a call reference ("CR") value. Thus, the same keyword set can be applied to a call reference #1, call reference #2, and call reference #3 resulting in the three states 130, 132, and 133. Further, movement from each state back to the Keyword Set Loaded state 130 could be independent for each of the various call legs. However, all during this time the SAC has a keyword loaded into memory.

Figure 2:
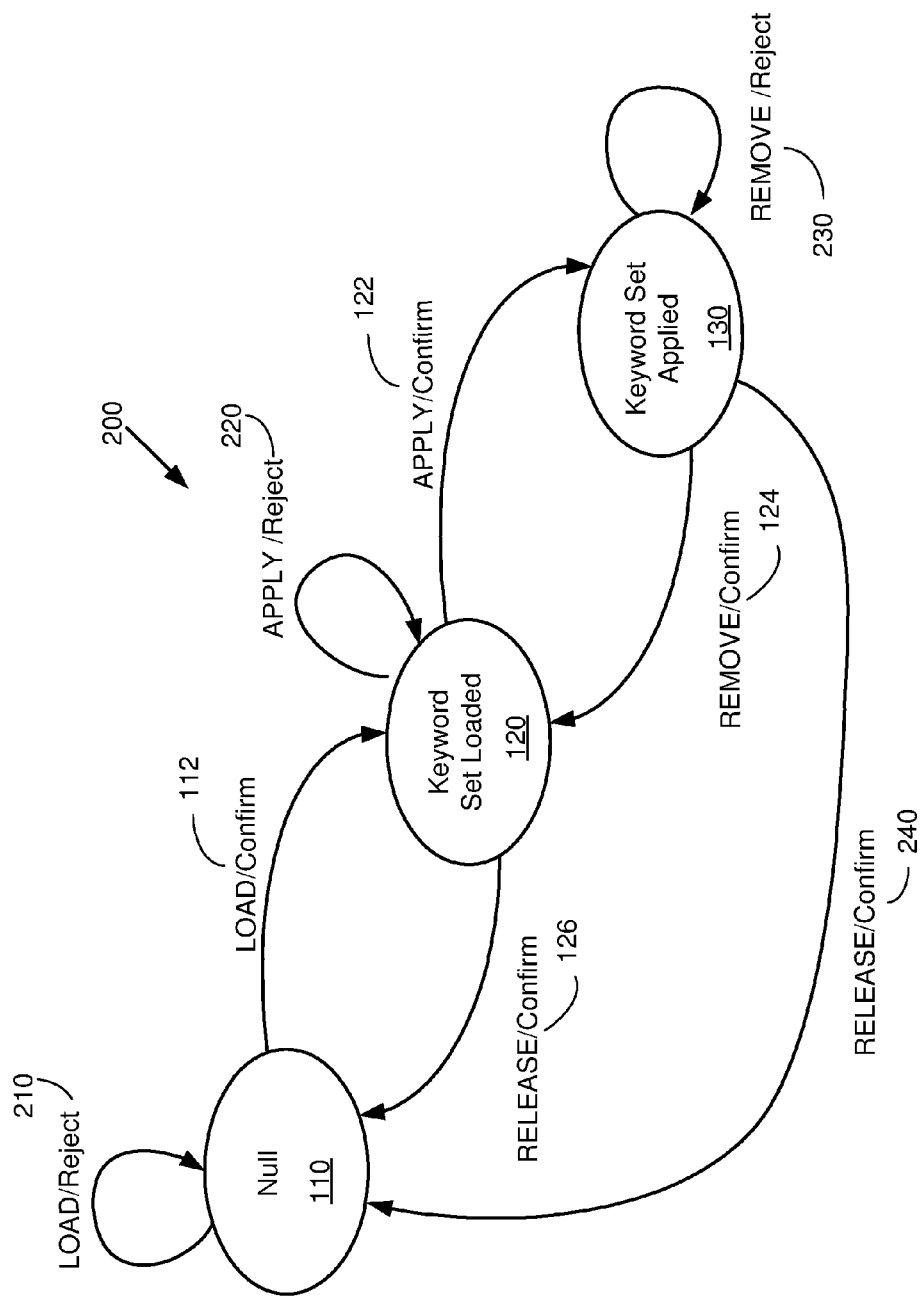

The state transition diagram 100 shown in FIG. 1A shows common and preferred transitions, but another representation of a state transition diagram 200 is shown in FIG. 2. FIG. 2 shows various exceptions and other transitions that may exist in other embodiments. Turning to FIG. 2, the diagram illustrates a variety of error or exceptional conditions, such as when a command is provided with incorrect parameters. For example, in the Null state 110, a LOAD command 210 may be received, but which identifies an incorrect (e.g., non-existing keyword set). In this case, the LOAD command 210 results not in a Confirmation response, but a Reject response 210. Further, the result is that the Null state 110 is maintained. Similarly, if in the Keyword Set Loaded state 120, an APPLY message 220 is received that incorrectly identifies a keyword set or call, the result also is a Reject response 220 and the state does not change. A similar state transition is defined for the Keyword Set Applied state 130 where an incorrect REMOVE command 230 also results in a Reject response 230 that results in maintaining the same state.

In another variation from FIG. 1A, a RELEASE command 240 may be received in the Keyword Set Applied state 130. This represents the situation of the SAC applying a keyword set to speech, and then receiving a command from the call handler indicating that the keyword set is no longer needed and the memory space it uses can be reallocated. Thus, the RELEASE command 240 may be followed with a Confirm response 240, even though the preferred transition may be to REMOVE the keyword set first, transitioning to Keyword Set Loaded state 120 and then to the Null state 110.

In some embodiments, this transition from the Keyword Set Applied state 130 to the Null state 110 may be prohibited, since doing so could adversely affect other Keyword Set Applied states that may be pending for the same keyword set. Thus, the transition between the Keyword Set Loaded state and the Keyword Set Applied state is call specific, whereas the transition from the Keyword Set Loaded state and the Null state is a global transition. It may be restricted to only occurring if there are no other remaining Keyword Set Applied states.

Command Parameters

Each of the LOAD, APPLY, REMOVE, and RELEASE commands may have parameters associated with them. The parameters that are indicated may vary according to embodiment. The LOAD command indicates that a particular keyword set is to be loaded, and hence it typically identifies the keyword set. In one embodiment, the keyword set may be identified by a universal resource identifier ("URI") or universal resource locator ("URL"). The keyword set may be located in the SAC data store, a remote data store, or on another system and transmitted to the SAC upon request.

In some embodiments, the LOAD command may have another parameter indicating a resource for which the keyword set is to be loaded. This could be a particular system, server, a particular trunk group, or a range of call references or call identifiers. Thus, when loading a keyword set for the resource, the keyword set is only available for within the scope of that resource. In other embodiments, such a parameter is not required. If the SAC receiving the LOAD command is unable to identify, locate, or otherwise cannot load the identified keyword set, then a Reject response may be returned, and the SAC stays in the Null state.

Similarly, in the Keyword Set Loaded State, the SAC may receive an APPLY command. This typically indicates the context for which the keyword set is to be applied. In one embodiment, the parameters identify the keyword set to be applied, a call reference of the call it should be applied to, and a party of the call. The name of the keyword set typically is the same name used as in the previous LOAD command. Presumably, once the keyword set is loaded, and the APPLY command is received referencing the same keyword set, there will not be any ambiguity in identifying the keyword set.

The call reference parameter (which may also be variously referred to as a call leg identifier, call identifier, etc.) is used to identify which particular instance of voice conversation the keyword set is to be applied to. Various protocols may use different names or labels to identify the voice communication between the call handler and the SAC. Presumably, in many embodiments there may be more than one simultaneous voice communication between the SAC and call handler, so that some form of identifier is required to distinguish one from the other.

The party indicator indicates whether the agent or the remote party's speech is to be analyzed. In some embodiments, this information could be identified by allocating unique call reference values for identifying the agent on a call and the remote party on that same call. However, in a preferred embodiment, a separate parameter is used to identify which party's speech is analyzed. Although the party indicators are generally referred to as "agent" and "remote party" in this description, other embodiments may use other names or labels.

In some embodiments, the keyword set is applied for each instance of voice communication as needed. Hence, an APPLY command may be sent to the SAC for each voice call established between the call handler and the SAC. In other embodiments, a parameter may be defined indicating that the keyword set is to be applied for all calls meeting a specific criterion between the call handler and the SAC. For example, assume that there may be a maximum of 50 calls for which the keyword set is to be applied, and the call handler and the SAC are both configured so that these calls will have a call reference value in the range of 1-50. The parameter in the APPLY command may indicate that the keyword set is to be applied to all current and future calls with a call reference value in the range of 1-50. This would avoid sending individual APPY commands for each call to the SAC. Further, since calls would terminate and other calls may be established reusing the same call reference values, this approach would avoid having to resend the APPLY command for each new call using a call reference value in the same 1-50 range.

The REMOVE command similarly references a particular keyword set, call reference value, and potentially indicates a particular party. It is possible that a keyword set may be removed only for one party, but not another. For example, returning back to the debt-collection example where the called party's speech is monitored for an indication of bankruptcy, once bankruptcy is detected from the remote party, the keyword set applied against the remote party may be removed, and a different keyword set is then applied to the agent. Then, once the agent's speech is confirmed for asking about the party's lawyer, that keyword set applied to the agent can be removed. Alternatively, in some embodiments, a keyword set may be removed after a certain amount of time. For example, if the keyword set is applied to a called party, and that party does not indicate they have filed for bankruptcy in the first five minutes of the call, that keyword set may be removed from being applied. Thus, the REMOVE command may indicate not only the call reference, but also the party to which it applies. If the keyword set is only being applied for a particular party, then it may be understood that a REMOVE command for that particular call implicitly applies to that particular party. Hence the REMOVE command may not explicitly indicate a party indicator in all embodiments. However, if the same keyword set has been applied to both parties, then not indicating a party the command pertains to may result in the keyword set being removed for both parties.

The RELEASE command also must indicate which keyword set it applies to. In some embodiments, a wildcard parameter can be defined to indicate "all keyword sets." In general, such wildcard parameters can also be defined for the other messages. Thus, a single RELEASE command could be used to terminate use of all keyword sets, and this would avoid transmitting a plurality of RELEASE messages. Because a RELEASE command indicates that the keyword set is no longer required, its use may not be defined in the context of a particular call for a particular party. That is, if any party on any call is using the keyword set, then the RELEASE command may not be sent. In one embodiment, only when all uses of the keyword set are to be terminated, should the RELEASE command be sent for an indicated keyword set.

The Confirm messages shown in FIG. 1A and FIG. 2 may also have parameters, which correlate with the particular command they are responding to. For example, a Confirm message may reflect the command name and parameters. This allows the call handler to know that the command it sent to the SAC has been acted upon. In some instances, the SAC may initiate a Confirm message on its own. For example, a call may be established between the call handler and the SAC. The call handler may request via the APPLY command that certain keyword sets are to be applied to either the remote party or the agent, as appropriate. During the call, the remote party may hang up, or the call may be terminated for other reasons. Since the call is terminated, and there is no basis for applying a keyword set to either party, the state may transition from the Keyword Set Applied state 130 to the Keyword Set Loaded state without any explicit REMOVE message. In some embodiments, a Confirm message may be sent from the SAC to the call handler to confirm that it has moved to the Keyword Set Loaded state. Similarly, it is possible to move all calls to the Null state 110 if all calls are terminated at once (e.g., due to a power failure, facility interruption, etc.).

Exemplary Message Sequence

Figure 3:
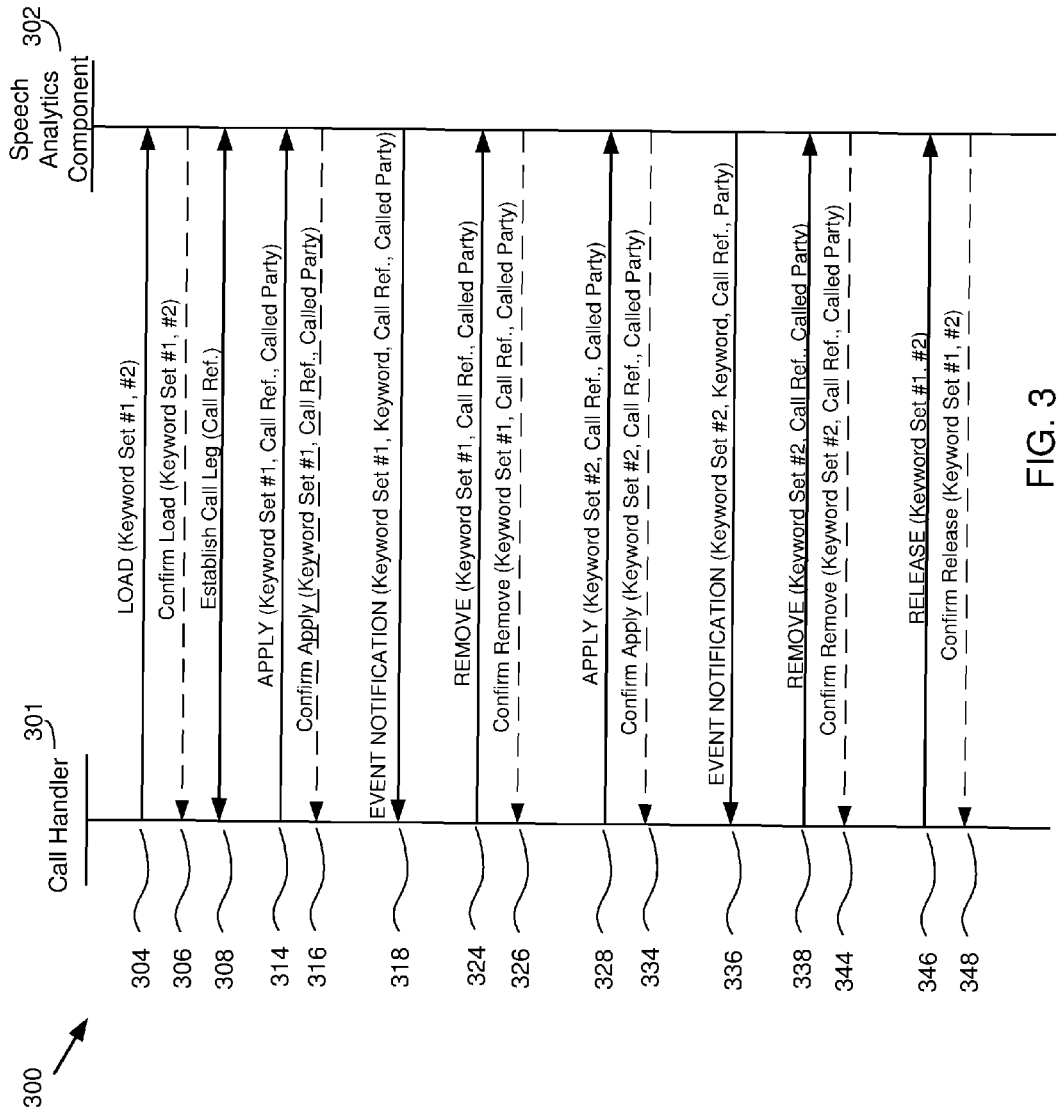
FIG. 3 illustrates an embodiment of a message exchange for managing use of keywords sets between a call handler and a speech analytics component.

An exemplary message flow between a call handler and a SAC is shown in FIG. 3. The messages exchanged pertain to an application where:

a. a call leg is established from the call handler to the SAC,
b. the call handler instructs the SAC to load two keyword sets into memory that will be used for analyzing speech of the called party and the agent,
c. the call handler then instructs the SAC to apply one keyword set for analyzing speech of the called party,
d. after detection of a keyword by the called party, the SAC is instructed to cease analyzing the called party's speech,
e. the SAC is then instructed to start analyzing the agent's speech using another keyword set,
f. after detecting a keyword from the agent, the SAC is instructed to cease analyzing the agent's speech, and
g. the SAC is then instructed by the call handler that no further use is required of the keyword sets.

Turning to FIG. 3, the line diagram 300 illustrates commands sent between the call handler 301 and the SAC 302. The exchange begins with a LOAD command 304 sent by the call handler, which includes names for the two keyword sets that will be used. For sake of illustration, and not for limitation, the somewhat generic names "Keyword Set #1" and "Keyword Set #2" are used, although the notation used shortens this to "Keyword Set #1, #2". Other formats which are more descriptive to the keyword sets may be used. Other embodiments may use a name that facilities retrieval of the keyword set. This command instructs the SAC to retrieve the appropriate keyword sets from their respective storage locations, establish the appropriate data structures, initialize any associated parameters, etc. The SAC responds with a Confirm message 306, which indicates the keyword sets have been loaded.

Next, the call handler establishes a call leg 308 to the SAC. This message could have been sent before the LOAD message 304, but in this scenario is it presumed that the call handler knows that it will be handling calls of a certain type and knows that certain compliance regulations are to be managed, and therefore instructs the SAC to load the appropriate keyword sets for this type of call before the call leg is established. Any protocol or mechanism known in the art for establishing the call leg can be used in message 308. The call leg is identified using a call reference label, and that value will be used subsequently to identify that call leg as opposed to other call legs. For the sake of simplicity, only a single call is referenced in this example.

At this point, the SAC has loaded the keyword sets, has received a call leg, and is now commanded to use a specified keyword set via an APPLY message 314. This instructs the SAC to use Keyword Set #1 for the specified call leg, and for a particular party (the called party). The SAC begins to monitor the speech of the called party for an instance of a keyword in the keyword set, and confirms the same via the Confirm message 316.

At some point, presuming that the called party utters a keyword in keyword set #1, the SAC returns an EVENT NOTIFICATION message 318, indicating that the called party for the indicated call leg was detected as speaking a specified keyword. In some embodiments the actual keyword detected may be reported, while in other embodiments, only the fact that a keyword was detected from the keyword set is indicated. In some embodiments, the SAC may have been instructed to analyze both the agent's and the called party's speech using the same keyword set, and hence it is necessary to indicate which party is associated with the event notification. Hence, the EVENT NOTIFICATION message 318 indicates that the called party is the party for which the keyword detection occurred.

The call handler at this point has been informed that the called party has spoken a keyword from keyword set #1, and determines that for this context, no further monitoring of the called party's speech is necessary. Hence, it instructs the SAC via a REMOVE message 324 to cease monitoring the called party's speech using keyword set #1 for that call leg. The SAC confirms doing so via the Confirm message 326.

At this point, the call handler knows that the agent's speech is to be monitored, and instructs the SAC via an APPLY message 328 to monitor the agent's speech using keyword set #2. The SAC confirms this via Confirm message 334.

Presuming that the agent utters a keyword in keyword set #2, the SAC returns an EVENT NOTIFICATION message 336 to the call handler. The call handler determines for this context, that no further monitoring of the agent's speech is necessary, and then instructs the SAC via a REMOVE message 338 to cease monitoring the agent's speech. The SAC responds with a Confirm message 344.

The process involving messages 308-344 may be repeated for subsequent calls. In other embodiments, there may be a number of simultaneous call legs between the call handler and the SAC. It can be appreciated that the call handler may have logic for different contexts that could alter the message flow. For example, the call handler could be configured to instruct the SAC to apply a third keyword set for the called party after detecting the agent's response. Or, the call handler may not remove a keyword set after initial detection, and instead monitor subsequent instances of keywords spoken from the keyword set. Those skilled in the art will recognize that the call handler could be configured to handle a variety of contexts, and variously instruct the SAC as to when certain keyword sets should be applied and removed.

For the sake of completeness, the example in FIG. 3 concludes with a RELEASE message 346. This message informs the SAC that there is no further need for the keyword sets #1 and #2, and that these keyword sets can be erased from working memory. Note that this command should not be issued if there are other pending calls which are using these keyword sets, or if subsequent calls are expected that involve these keyword sets. Thus, the RELEASE command may be used less frequently than the REMOVE message (as is the case for the LOAD command). Finally, the process completes with the SAC returning a Confirm message 348 once keyword sets #1 and #2 have been released from working memory.

Additional Capabilities

The commands discussed above, LOAD, APPLY, REMOVE, and RELEASE, are presented in a basic form. Additional capabilities can be added to optimize operation. For example, a capability can be defined that automatically removes the application of a keyword set after detection of a keyword. This could be accomplished by defining a new message, such as APPLY_WITH_AUTO-REMOVE, or by defining a parameter in the APPLY message for this function. The parameter would indicate whether the keyword set would be automatically removed after detection of a keyword set. This would eliminate the need to send a REMOVE message after the call handler receives an EVENT NOTIFICATION from the SAC.

Other messages may instruct the SAC to apply two keyword sets simultaneously. This would involve adding parameters to a single APPLY message to be functionally equivalent to sending two APPLY messages. In other embodiments, a single message (or additional parameters may be defined) can be defined that instructs the SAC to apply a first keyword set to a first party and automatically apply a second keyword set to the other party upon detection of the first keyword set of the first party.

Other embodiments may define additional capabilities for applying a first keyword set to an indicated party for all call legs meeting particular criteria. For example, a trunk group or set of call reference values may define the criteria so that whenever a call leg is established, the SAC will automatically apply an indicated keyword set. For example, a simple script or message could be defined that indicates for all calls involving a call reference value between 1 and 100, keyword set #1 should be applied to the called party's speech after the call is set up to the SAC.

Alternatively, a standing command could be defined for the SAC to always apply a particular keyword set, including for a particular party, and for a particular call(s). For example, certain contexts may require that the agent's speech always be monitored for profanity. One approach is to define a "global" APPLY command that indicates a keyword set should be applied for all calls, so that the agent's speech may be monitored at all times using a specified keyword set. This would avoid having to issue an APPLY message for each call leg being established.

No doubt those skilled in the art will recognize that for certain contexts, a repeated pattern for applying and/or removing keyword sets can be optimized by defining either new messages and/or new parameters. These variations are within the scope of the concepts and technologies presented herein.

In other embodiments, the call handler may query the SAC for real-time management information. Specifically, messages can be defined for the call handler (or other device) to query the SAC for a level of resource usage. This would allow the call handler to adjust which commands to send to the SAC. For example, assume that each of several dozen agents' speech is monitored for profanity. Doing so may consume a large percentage of the computing resources in the SAC. Furthermore, assume that a large percentage of calls may require monitoring agent compliance in a context that requires monitoring both the agent's speech and the called party's speech. Doing so may further strain the computing resources of the SAC. The call handler may issue a command to query resource usage and then command removal of the application of the profanity keyword set. In some embodiments, the nature of the agent workforce may be that profanity is not a problem to monitor, or that it is not necessary to monitor this if the call context requires that the processing resources in the SAC should instead be used for more critical compliance monitoring aspects.

It should become apparent to those skilled in the art that the above tools allow the call handler to instruct the SAC to more efficiently apply keyword sets for calls as required by the context. This allows the call handler to instruct the SAC accordingly to handle a diverse range of compliance aspects, with a reasonable processing capacity in the SAC. This avoids having to engineer the SAC to have processing resources to handle a peak level of speech processing, when in many instances, that peak level is not required.

Command Process Flows

Representative process flows for the various commands identified above are now presented. These describe one potential process flow in the SAC upon receiving a command from the call handler in regard to managing a keyword script. For purposes of brevity, the basis operation of the LOAD, APPLY, REMOVE, and RELEASE commands are presented, without detailed explanation of the various alternatives, extensions, and other parameters that may be added on.

LOAD Command

The first process flow considered is the LOAD command, which loads a keyword set into working memory of the SAC. The keyword set may be initially stored in secondary memory, such as disk storage, as opposed to main memory or working memory, which typically allows faster access. The keyword store may be stored in non-volatile memory, such as a disk store, either local or remote to the SAC. Thus, the LOAD command is used to instruct the SAC to retrieve the keyword set and place it into working memory and prepare any other data structures necessary for its use.

Figure 4:
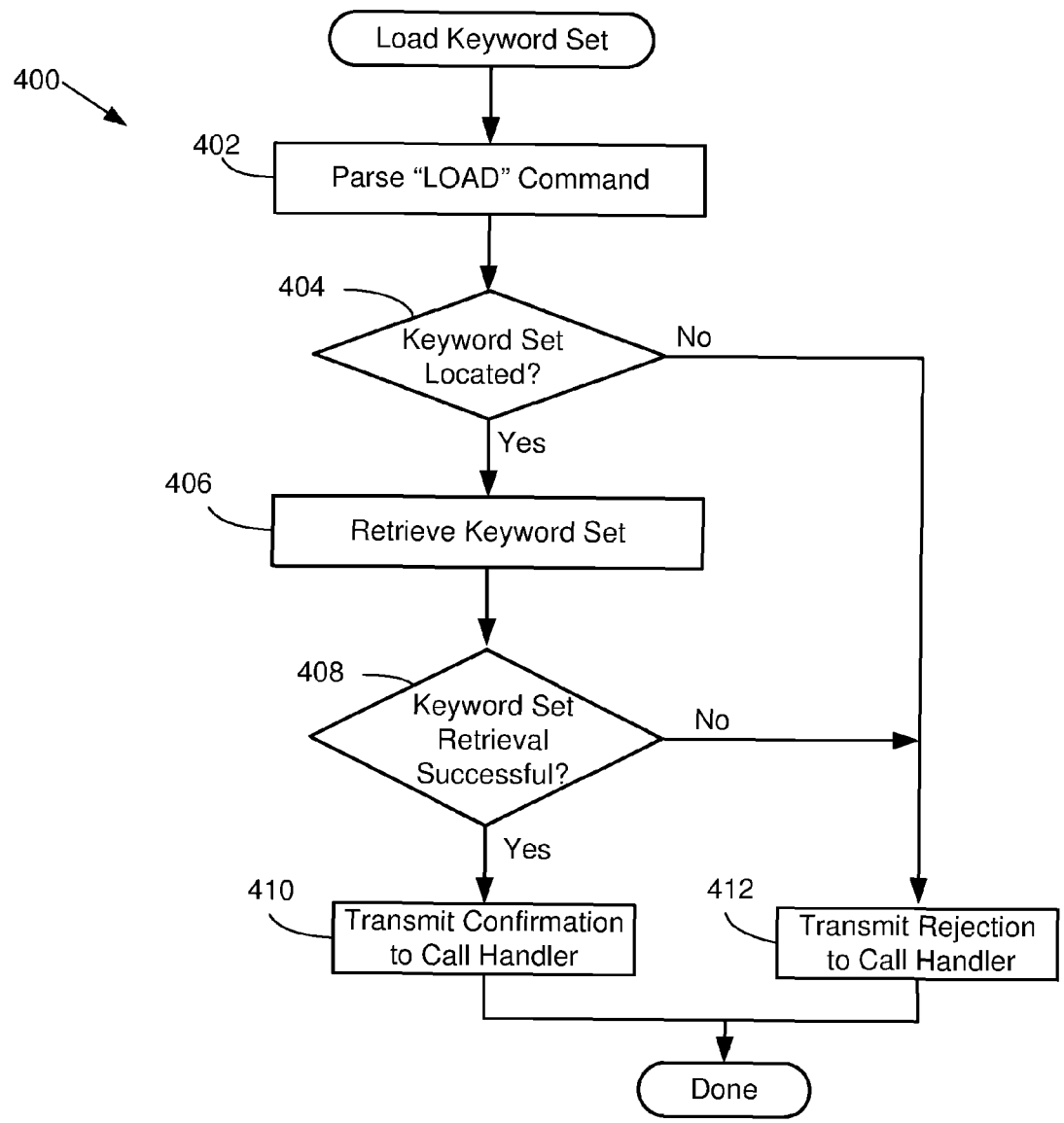
FIG. 4 illustrates one embodiment of a process flow associated with loading a keyword set in a speech analytics component.

The process flow 400 is shown in FIG. 4. The process begins with receiving and parsing the LOAD command in operation 402. This operation is useful to identify the various parameters, such as the keyword set name or address of its location. The identification of the keyword set may occur via various means, including by identifying a unique name that can be resolved into a location of the keyword set, or a unique path or location of the keyword set. After parsing the keyword set, a determination is made whether the keyword set can be located in operation 404. If not, then the process continues to operation 412 where a Reject message is returned, which may also indicate the reason why the command could not be accomplished.

Assuming the location is identified in operation 404, the SAC then retrieves the keyword set in operation 406. Next, a determination is made in operation 408 whether the keyword set was successfully retrieved and loaded into main memory. If not, then the process continues to operation 412 where a reject message is sent. Otherwise, a Confirm message is transmitted to the call handler in operation 410. At this point, the process is completed.

APPLY Command

The APPLY command may be the most frequently used command. Typically, a keyword set is loaded once, but applied many times. In some embodiments, a keyword set is applied for each applicable call instance, so that an APPLY command may be sent by the call handler to the SAC after each call leg is established to the SAC.

Figure 5:
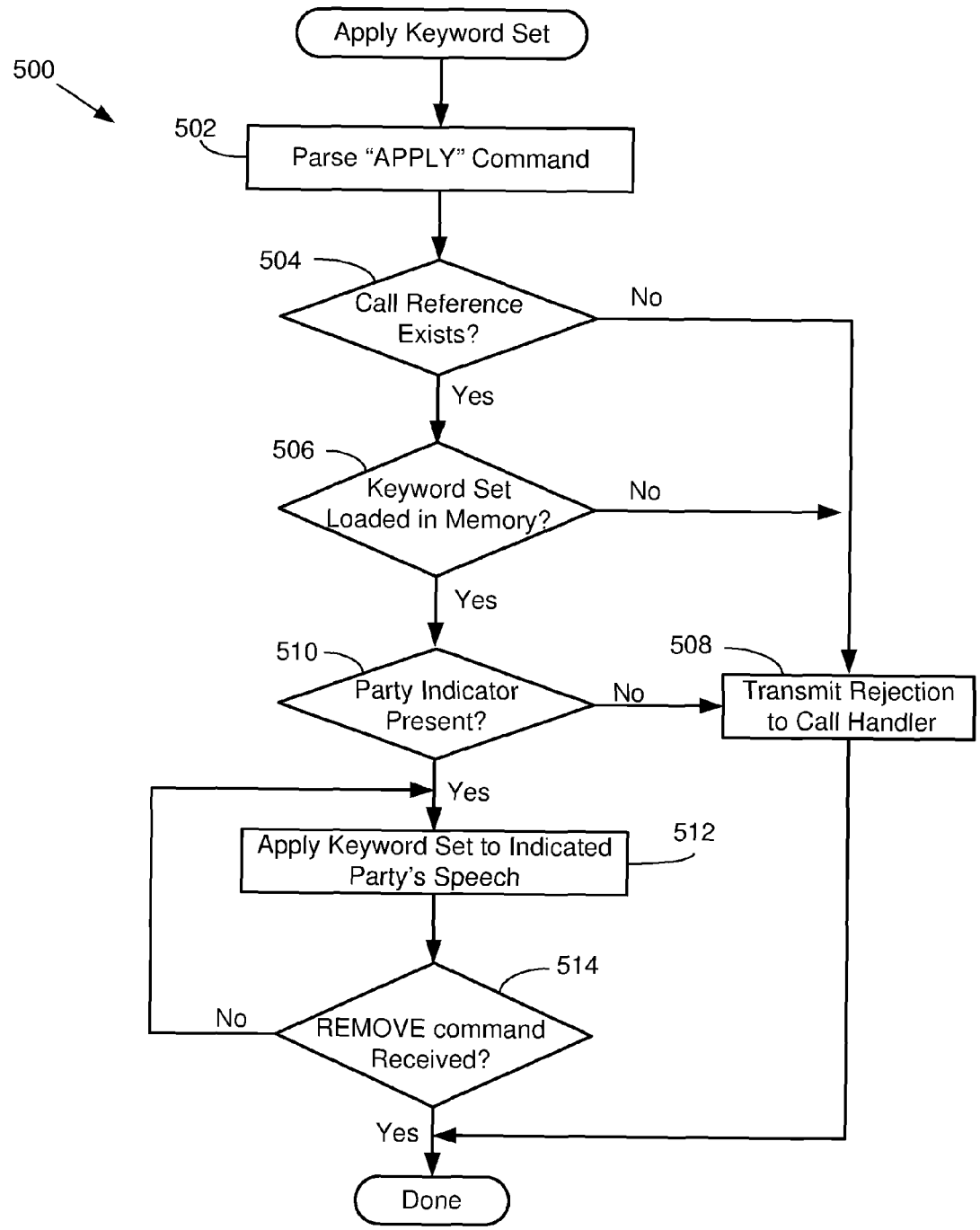
FIG. 5 illustrates one embodiment of a process flow associated with applying a keyword set in a speech analytics component.

The process 500 shown in FIG. 5 begins with the SAC parsing a received APPLY command in operation 502. The parsing identifies the parameters in the message, one of which may be the identifier of the call leg, i.e., the call reference. Depending on the protocol used, other names for the identifier may be used. A test in operation 504 determines whether the call reference exists—e.g., does a corresponding call exist? If not, then the process proceeds to operation 508 wherein a Reject message is transmitted back to the call handler detailing the error.

Assuming the call reference is identified in operation 504, the process then continues to determine if the identified keyword set has been identified and loaded into memory in operation 506. Again, if it has not, then a Reject message is returned in operation 508. Otherwise, the process continues to check for the presence of a party indicator in operation 510. The party indicator indicates whether the keyword set should be applied to the agent, the remote party, or both. If this parameter is not present, or not recognized, then the process continues to operation 508 where a Reject message is transmitted to the call handler.

Otherwise, assuming that the keyword, call reference, and party indicator are all recognized and it is possible to operate on the information, the identified keyword set is applied to the indicated party's speech in operation 512. It is at this point that the SAC is using the keyword set to analyze the speech for purposes of determining whether a match in one of the keywords exists.

The techniques used by the SAC for detecting a keyword in the keyword set can be any of the techniques known by those skilled in the art of speech recognition. The particular techniques used can vary, and the concepts and technologies herein can apply to a variety of such techniques.

Figure 6:
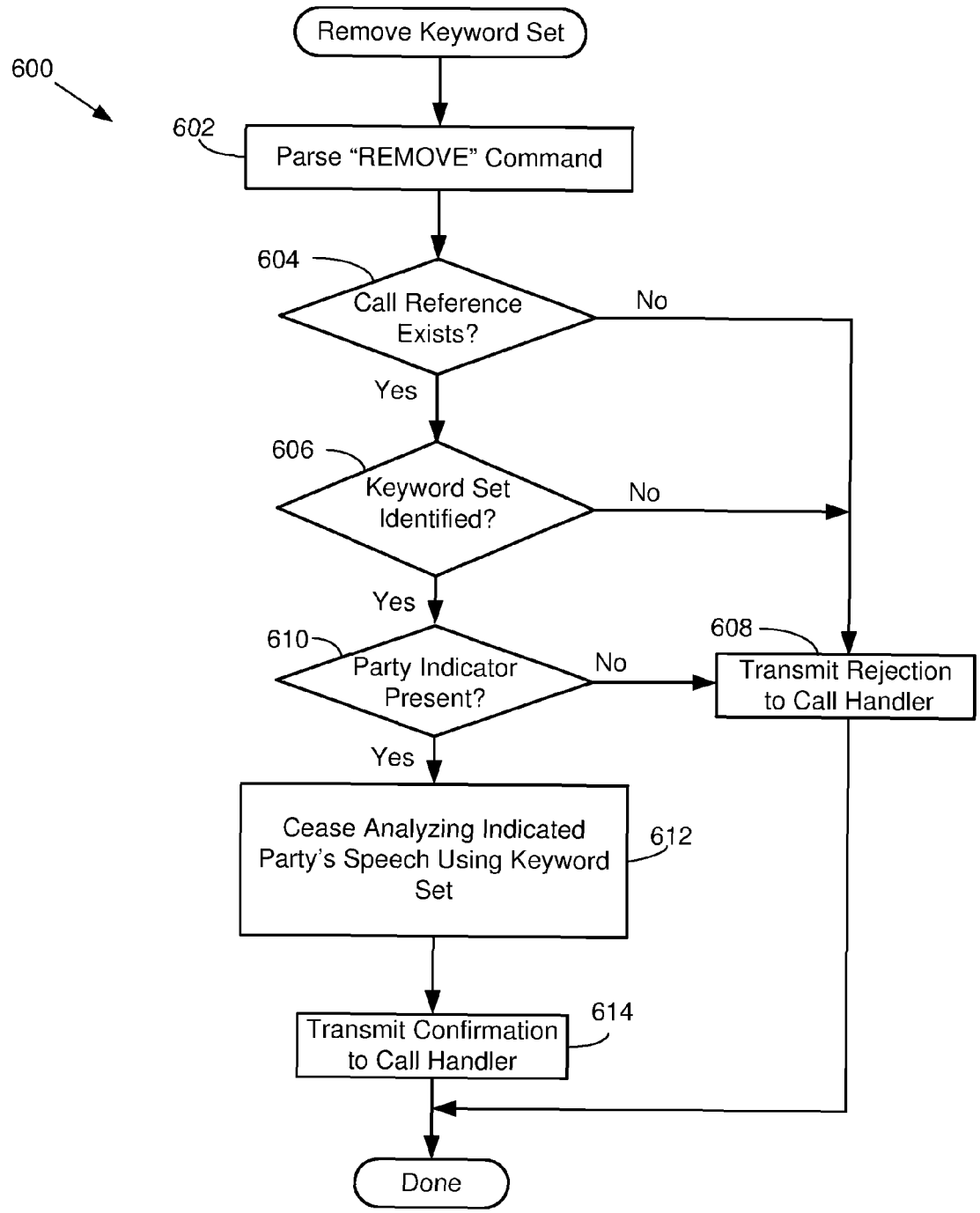
FIG. 6 illustrates one embodiment of a process flow associated with removing a keyword set in a speech analytics component.

The application of the keyword set continues until a REMOVE command is received, as shown by the test in operation 514 which loops back to operation 512 if not received. Once a REMOVE command is received, then the application of the keyword set is terminated (see, e.g., FIG. 6 for details). Note that in other embodiments, other exceptional conditions may occur that may terminate the application of the keyword set. These are not shown, but those skilled in the art could readily identify such situations in light of the current disclosure. For example, if the call leg between the call handler and the SAC were suddenly terminated during operation 512, this could terminate application of the keyword set.

REMOVE Command

The REMOVE command is used to instruct the SAC to cease application of a keyword set for a particular party on a particular call. This allows the SAC to conserve processing resources, and further allows the SAC to avoid returning EVENT NOTIFICATION messages to the call handler, which the call handler may not require. Thus, avoiding sending unnecessary indications to the call handler also saves processing resources in the call handler.

As noted above, ceasing application of a keyword set to a call can occur in various abnormal ways, such as terminating the call while the keyword set is being applied. However, a normal use case is for the call handler to send a REMOVE command to the SAC. This process flow is illustrated in the flow 600 of FIG. 6.

The process 600 begins with the SAC receiving and parsing a REMOVE command in operation 602 to identify the parameters, including the keyword set identifier, call reference, and party indicator. If any of the call reference, keyword set identified, or party indicator are not identifiable, recognized, or present, as determined in operations 604, 606, and 610, then a Reject message is transmitted to the call handler in operation 608.

If all of these parameters are able to be operated upon, then analyzing the party's speech using the keyword set is ceased in operation 612. A Confirm message is transmitted to the call handler reporting this in operation 614. The process is then completed. Of course, the termination of the application of the keyword set could occur in other ways, including terminating the call, though this is not shown in FIG. 6.

RELEASE Command

Figure 7:
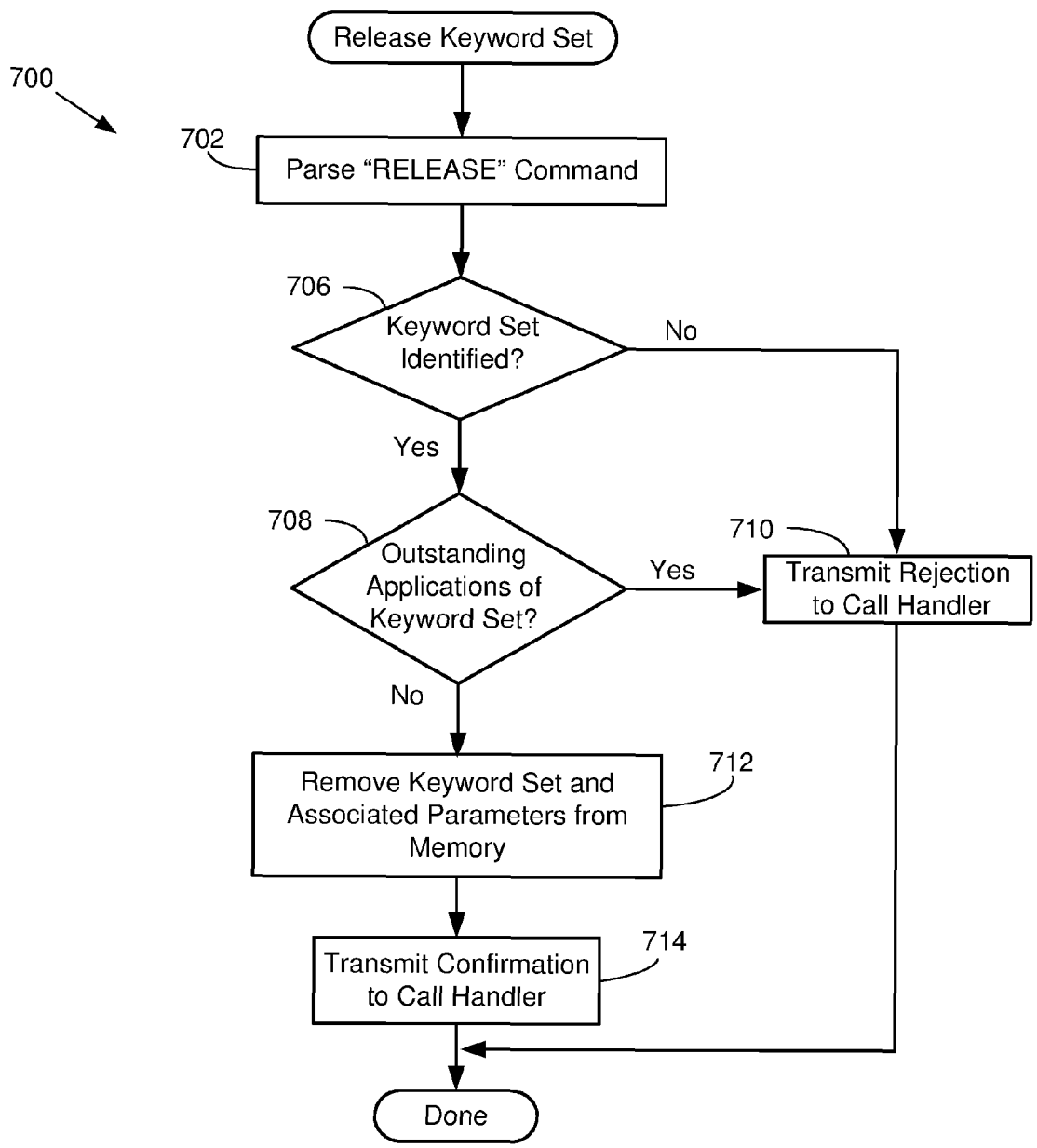
FIG. 7 illustrates one embodiment of a process flow associated with releasing a keyword set in a speech analytics component.

The RELEASE command is sent to the SAC indicating that the keyword set is no longer required, and main memory used for storage of it can be allocated for other purposes. Of course, this does not result in erasing any copies of the keyword set in secondary storage, which may be used for subsequent re-loading. The process is shown in FIG. 7, and the process 700 begins with the SAC receiving and parsing the RELEASE command in operation 702. The parsing identifies the parameters, such as the keyword set. In various embodiments, specific party indicator and call reference identifiers are not present, since the RELEASE command should be used after keyword sets are removed from use. Thus, during normal operation, keyword sets are not released if there is any instance of it being applied.

A determination is made whether the keyword set identified is currently loaded in operation 706. If the keyword set has not been loaded, or is not recognized, or is otherwise cannot be acted upon, then the process proceeds to operation 710 where a Reject message is transmitted to the call handler indicating the cause of the error.

Otherwise, assuming the keyword set has been loaded, a test is made to determine if the keyword set is currently being applied for any pending calls in operation 708. If so, than a Reject may be transmitted to the call handler in operation 710. In other embodiments, the keyword set may automatically be removed from use, and the process continues to operation 712.

Assuming the keyword set can be removed, then in operation 712 the keyword set is removed from memory. Data structures associated with the keyword set can also be discarded. A Confirm message is transmitted to the call handler in operation 714.

Exemplary Processing Device Architecture

Figure 8:
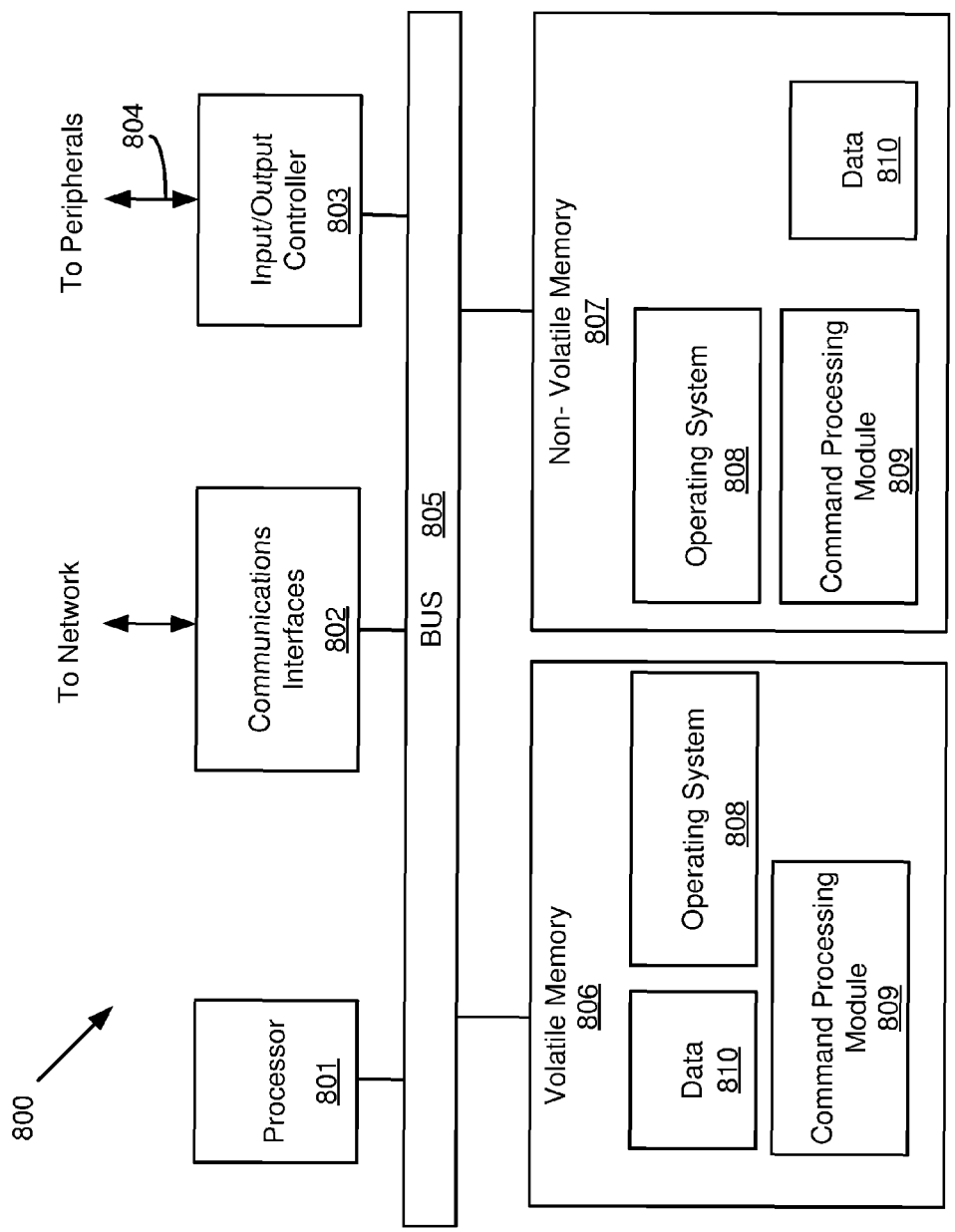
FIG. 8 illustrates one embodiment of a computing processing architecture used in the speech analytics component for practicing the technologies and concepts enclosed herein.

FIG. 8 is an exemplary schematic diagram of a SAC processing system 800 that may be used in an embodiment to practice the technologies disclosed herein. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities specially adapted to perform the functions described herein.

As shown in FIG. 8, the SAC processing system 800 may include one or more processors 801 that may communicate with other elements within the processing system 800 via a bus 805. The processor 801 may be implemented as one or more complex programmable logic devices ("CPLD"), conventional microprocessors, multi-core processors, digital signal processors ("DSP"), system-on-a-chip ("SOC"), coprocessing entities, application-specific integrated circuits ("ASIC"), field programmable gate arrays ("FPGA"), programmable logic arrays ("PLA"), hardware accelerators, integrated circuit processors, other circuitry, or the like. These or other processing elements may perform the speech analytics related functions of the SAC. These process elements may also perform the processing of the above mentioned commands, as well as formulate the response messages to the call handler.

In one embodiment, the SAC processing system 800 may also include one or more communications interfaces 802 for communicating data via the local network with various external devices, such as the call handler. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay. The communications interfaces 802 may be used for receiving the call legs as well as receiving commands and transmitting responses. A single interface, or multiple interfaces may be used. Further, the same or different interfaces may be conveyed using a single communication facility or different facilities. For example, one interface may be used for receiving call legs, and another interface maybe used for commands/responses, and both could be conveyed as IP based protocols over an Internet facility. In either embodiment, similar or different protocols may be used for communicating the voice data and the command data. In one embodiment, an Internet Protocol ("IP") based interface for voice, such as Session Initiated Protocol ("SIP"), may be used for controlling the voice call, whereas in other embodiments, conventional time division trunks and signaling techniques may be used to convey the voice call legs and signaling.

The input/output controller 803 may also communicate with one or more input devices or peripherals using an interface 804, such as, but not limited to: a keyboard, a mouse, a touch screen/display input, microphone, pointing device, etc. The input/output controller 803 may also communicate with output devices or peripherals, such as displays, printers, speakers, headsets, banner displays, etc.

The processor 801 may be configured to execute instructions stored in volatile memory 806, non-volatile memory 807, or other forms of non-transitory computer-readable storage media accessible to the processor 801. The volatile memory 806 may comprise various types of memory technologies, including, but not limited to: random access memory ("RAM"), dynamic random access memory ("DRAM"), static random access memory ("SRAM"), and other forms well known to those skilled in the art. The non-volatile memory 807 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. Specifically, the non-volatile memory 807 may store one or more computer program modules, such as a command processing module 809 containing instructions for performing the process and/or functions associated with the technologies disclosed herein, and related data 810 such as keyword sets, and/or operating system code 808. In addition, the command processing module 809 may generate or access the data 810 in the non-volatile memory 807, as well as in the volatile memory 806. The volatile memory 806 and/or non-volatile memory 807 may be used to store other information including, but not limited to: records, applications, programs, scripts, source code, object code, byte code, compiled code, interpreted code, machine code, executable instructions, or the like. The volatile memory 806 may include keyword sets, action sets, and other related data to implement the concepts and technologies disclosed herein. These instructions may be executed or processed by, for example, the processor 801. These may form a part of, or may interact with, the command processing module 809 and/or data 810.

In various embodiments, the processor upon acting on a LOAD command may copy data 810 in the form of a keyword set from the non-volatile or secondary memory 807 into the volatile or primary memory 806 in order to apply the keyword set to a call at the communication interface 802. The processor acting upon a RELEASE command for an identified keyword set may remove the keyword set stored in the volatile memory 806 to free up that resource for other uses. Of course, the keyword set would remain stored in the non-volatile memory in case it needed to be re-loaded at a later time.

The technologies described herein may be implemented in various ways, including as computer program products comprising memory storing instructions causing a processor to perform the operations associated with the above technologies. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The invention claimed is:

1. A speech analytics component in a call center comprising:
    a first interface for receiving a voice call from a call handler identified by a call reference value, the voice call comprising a first data stream associated with an agent and a second data stream associated with a remote party;
    a second interface for receiving commands;
    a memory configured to store a plurality of keyword sets; and
    a computer processor configured to:
        receive the voice call at the first interface along with an indication of the call reference value,
        receive a first command at the second interface identifying a keyword set from among the plurality of keyword sets, the call reference value, and a party identifier indicating the remote party, wherein the first command indicates application of the keyword set for analyzing speech of the remote party on the voice call,
        analyze the speech in the second data stream from the remote party using the keyword set identified to determine a keyword in the keyword set was spoken in the second data stream, and
        provide an indication over the second interface indicating detection of the keyword in the second data stream and the call reference value.

2. The speech analytics component of claim 1, wherein the computer processor is further configured to:
    receive a second command at the second interface identifying a second keyword set, the call reference value, and the party identified indicating the agent, wherein the second command indicates application of the second keyword set for analyzing speech of the first data stream;
    analyze the speech in the first data stream from the agent using the second keyword set; and
    provide a second indication over the second interface indicating detection of the second keyword.

3. The speech analytics component of claim 1, wherein the computer processor is further configured to:
    receive a second command at the second interface terminating application of the keyword set for analyzing the speech in the second data stream, wherein the speech analytics component ceases application of the keyword set in analyzing the speech in the second data stream.

4. The speech analytics component of claim 3, wherein the computer processor is further configured to:
    receive a third command at the second interface after receiving the second command, the third command instructing a second keyword set to be applied for analyzing speech in the second data stream.

5. The speech analytics component of claim 1, wherein the computer processor is further configured to:
    receive a second command at the second interface indicating that the keyword set is no longer required to be stored in the memory.

6. The speech analytics component of claim 1, wherein the computer processor is further configured to:
    load the keyword set into the memory in response to receiving a command on the second interface identifying the keyword set to be loaded.

7. The speech analytics component of claim 1, wherein the indication provided on the second interface indicating detection of the keyword in the second data stream and the call reference value further indicates the remote party.

8. The speech analytics component of claim 1, wherein the computer processor is further configured to:
    retrieve the keyword set from a secondary memory prior to application of the keyword set for analyzing speech of the remote party on the voice call.

9. A method for processing speech from a call in a call center comprising:
    establishing a call leg of the call from a call handler to a speech analytics component in the call center, wherein the call leg is identified by a call reference value indicated to the speech analytics component, and wherein the call is between an agent and a remote party;
    receiving a first message at the speech analytics component identifying the call reference value, a party identifier of a party on the call, and a first keyword set from among a plurality of keyword sets to be used for analyzing speech of a party indicated by the party identifier, wherein the party indicated is the remote party;
    analyzing the speech by the speech analytics component of the remote party using the first keyword set to detect a keyword spoken by the remote party; and
    transmitting an indication from the speech analytics component indicating detection of the keyword in the speech of the remote party and the call reference value.

10. The method of claim 9, wherein the indication from the speech analytics component indicating detection of the keyword in the speech of the remote party and the call reference value further indicates the party identifier.

11. The method of claim 9 further comprising:
    receiving a second message at the speech analytics component after the indication is transmitted from the speech analytics component indicating detection of the keyword, the second message instructing the speech analytics component to terminate application of the keyword set in analyzing the speech from the remote party.

12. The method of claim 11, further comprising:
    receive a third message at the speech analytics component after the second message is received, the third message indicating that the keyword set is no longer required to be stored in a memory of the speech analytics component.

13. The method of claim 11, further comprising:
    receive a third message at the speech analytics component after the second message is received, the third message instructing the speech analytics component to apply a second keyword set from among the plurality of keyword sets to speech of at least one of the agent and the remote party.

14. The method of claim 13, further comprising:
    transmitting a second indication from the speech analytics component indicating the call reference value and detection of a second keyword from the second keyword set in the speech of the at least one of the agent and the remote party; and receive a fourth message at the speech analytics component indicating the second keyword set is no longer to be applied to the speech of the at least one of the agent and the remote party.

15. A computer-readable, non-transitory medium storing instructions that when executed by a processor cause the processor to:
  store a call reference value associated with a call leg received from a call handler on a first interface;
  process a first command received on a second interface identifying a keyword set from among a plurality of keyword sets, the call reference value, and a party identifier identifying one of an agent or a remote party, wherein the first command indicates application of the keyword set for detecting a keyword of the keyword set in speech by a party on the call leg indicated by the party identifier;
  determine the keyword of the keyword set was spoken by the party; and
  transmit an indication over the second interface indicating the call reference value and detection of the keyword in the keyword set in the speech from the party.

16. The computer-readable, non-transitory medium of claim 15, wherein the instructions further cause the processor to:
  receive a second command on the second interface comprising the call reference value terminating application of the keyword set to the speech of the party; and
  in response to processing the second command, terminate application of the keyword set to the speech of the party.

17. The computer-readable, non-transitory medium of claim 16, wherein the instructions further cause the processor to:
  process a third command on the second interface identifying a second keyword set, the call reference value, and another party identifier comprising one of the agent or the remote party, wherein the third command indicates application of the second keyword set for detecting a second keyword of the second keyword set in speech by the another party on the call leg, and wherein the another party is different from the party;
  determine the second keyword of the second keyword set was spoken by another party; and
  generate a second indication over the second interface indicating detection of the second keyword in the second keyword set in the speech from the another party and the call reference value.

18. The computer-readable, non-transitory medium of claim 17, wherein the instructions further cause the processor to:
  process a fourth command, wherein the fourth command indicates terminating application of the second keyword set to the speech of the another party; and
  in response to processing the fourth command, terminate application of the second keyword set to the speech of the another party.

19. The computer-readable, non-transitory medium of claim 15, wherein the instructions further cause the processor to:
  process a second command received prior to the first command, wherein the second command indicates retrieval of the keyword set from a memory store.

20. The computer-readable, non-transitory medium of claim 15, wherein the instructions further cause the processor to:
  include the party identifier when transmitting the indication.

* * * * *